(12) United States Patent
Sanami

(10) Patent No.: US 8,842,300 B2
(45) Date of Patent: Sep. 23, 2014

(54) IMAGE PROCESSING APPARATUS AND PRINTING METHOD FOR PRINTING IMAGES ACCORDING TO VARIABLE INFORMATION ABOUT ENVIRONMENT LIGHT CONDITION

(75) Inventor: Hiroyuki Sanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 11/870,177

(22) Filed: Oct. 10, 2007

(65) Prior Publication Data

US 2008/0137114 A1 Jun. 12, 2008

(30) Foreign Application Priority Data

Dec. 7, 2006 (JP) ................................ 2006-330694

(51) Int. Cl.
*G06F 3/12* (2006.01)
*G06F 17/24* (2006.01)
*H04N 5/262* (2006.01)

(52) U.S. Cl.
CPC ............ *G06F 3/1208* (2013.01); *G06F 3/1243* (2013.01); *G06F 17/248* (2013.01)
USPC ........ 358/1.13; 358/1.9; 358/1.15; 348/207.1

(58) Field of Classification Search
None
See application file for complete search history.

(56) References Cited

U.S. PATENT DOCUMENTS 7,158,144 B2 1/2007 Shiraiwa et al.
2004/0196376 A1* 10/2004 Hosoda et al. ............. 348/207.1

FOREIGN PATENT DOCUMENTS

| JP | 08-190636 A | 7/1996 |
|---|---|---|
| JP | 11-041478 A | 2/1999 |
| JP | 11-041478A A | 2/1999 |
| JP | 2000-048216 A | 2/2000 |
| JP | 2000-307883 A | 11/2000 |
| JP | 2004-288028 A | 10/2004 |

* cited by examiner

*Primary Examiner* — Thomas D Lee
*Assistant Examiner* — Pawandeep Dhingra
(74) *Attorney, Agent, or Firm* — Canon USA Inc IP Division

(57) ABSTRACT

An image processing apparatus for performing printing by replacing objects in a master template with data stored in a database and executing a process according to a record in the database includes a unit configured to specify a predetermined field and other fields in the database, and a unit configured to perform image processing according to information indicated by the specified other fields, on image data indicated by the specified predetermined field.

7 Claims, 12 Drawing Sheets

FIG.10

| TYPES OF LIGHT SOURCE | THREE-BAND TYPE |
| --- | --- |
| | HIGH COLOR RENDERING |
| | ORDINARY TYPE |

FIG.11

| LUMINANCE | 6000lx |
| --- | --- |
| | 5000lx |
| | 4000lx |
| | 3000lx |

FIG.12

| COLOR TEMPERATURE | 6000K |
|---|---|
| | 5000K |
| | 4200K |
| | 3500K |
| | 3000K |

IMAGE PROCESSING APPARATUS AND PRINTING METHOD FOR PRINTING IMAGES ACCORDING TO VARIABLE INFORMATION ABOUT ENVIRONMENT LIGHT CONDITION

BACKGROUND OF THE INVENTION

1. Field of the Invention

The present invention relates to an image processing apparatus and a printing method for displaying text data and image data stored in a storage device on a display device and outputting the data to a printer.

2. Description of the Related Art

Among software applications which input, edit and print an image and characters, there are applications which include a function to print variable information (this function is hereinafter referred to as variable printing or variable data printing).

The variable printing function enables a user to change only a part of data as variable information in each print job while maintaining a general layout or main design. In label printing, for example, barcode and price information can be variably printed.

As variable data in printing, there are, for example, a specific text object and image object. More specifically, data specified as variable are read from a previously prepared database and printed. Such data is changed in each printing job.

When an application including the variable printing function is used, it is possible to continuously print posters by changing only a part of data for different shops or places while posters can be displayed without changing the print design itself. For example, when a business corporation running a plurality of shops and stores are going to print and distribute posters for its individual shops and stores, a general layout design is prepared in advance. Addresses and map data of the shops can be provided as variable data in the storage area of a database or a computer.

By reading the database and the general layout according to the application, it is possible to print posters in which only a shop address and map are changed while the general layout is retained. That is, by replacing a specified object on the master template of a poster with data from the database, each print can be different in units of records stored in the database. As technology for printing variable data, Japanese Patent Application Laid-Open Nos. 08-190636 and 2000-048216, for example, are known.

It is well known that when print product is displayed, its color is affected by the environment light of the place. In other words, the color of the print product looks changed depending on conditions of a light source at the place where it is observed. For example, even if the meat looks fresh when it is printed, it often occurs that the meat seems to have lost freshness under the environment light at the place where the print product is displayed. Besides food, a skin color of a person printed on a poster can also look different due to a change in the condition of the environment light.

With regard to a method for correcting the effects of light as described above, Japanese Patent Application Laid-Open No. 11-041478 discusses a correction function that ensures that the colors of pictures look unchanged regardless of the environmental condition of the place where print product is observed, and discusses a simple method of setting the correction function.

Generally, print product, such as a poster, is made for display purpose. Since posters are displayed in various places, the condition of a light source can differ according to display locations. Therefore, there is requirement to make printed product subjected to necessary corrections so that a constant appearance as desired can be obtained regardless of the light source condition.

Moreover, images used for variable printing have not necessarily been corrected in a desirable manner. Therefore, in addition to performing printing by using the variable printing function, various corrections are required to be made to image data. In such a case, a plurality of image data to which various corrections have been made, can be prepared and it can be specified which image data is to be used out of a plurality of image data. However, in this configuration, corrected image data needs to be prepared in advance to support various kinds of correction. If a plurality of images needs to be prepared according to different correction processes as to the same image, it is difficult for a user to specify an appropriate image, thus there is a chance that the user may specify an inappropriate one. Since a correction process according to an environment light needs to be performed on the entire area of the print product, in a conventional configuration, it is necessary to prepare different print data for different correction processes.

SUMMARY OF THE INVENTION

An exemplary embodiment of the present invention is directed to a method for easily realizing a print in which corrections are made in consideration of a light source in the display locations when variable data is printed.

Another exemplary embodiment of the present invention is directed to a method for specifying a correction value to desired image data in variable data printing.

According to an aspect of the present invention, an image processing apparatus for performing printing by replacing objects in a master template with data stored in a database and executing a process according to a record in the database, includes a unit configured to specify a predetermined field and other fields in the database, and a unit configured to perform image processing according to information indicated by the specified other fields, on image data indicated by the specified predetermined field.

According to another aspect of the present invention, an image processing apparatus for performing printing by replacing objects in a master template with data stored in a database and executing a process according to a record in the database, includes a unit configured to specify a predetermined field in the database, and a unit configured to perform image processing on an entire page or a part of a page to be printed, according to information indicated by the specified predetermined field.

According to yet another aspect of the present invention, a method for performing printing by replacing objects in a master template with data stored in the database and executing a process according to a record in the database, includes specifying a predetermined field and the other fields in the database, performing image processing according to information indicated by the specified other fields, on image data indicated by the specified predetermined field, and performing the process in units of record to output an image.

According to a still other aspect of the present invention, a method for performing printing by replacing objects in a master template with data stored in the database and executing a process according to a record in the database includes specifying a predetermined field in the database performing image processing according to information indicated by the specified predetermined field, on an entire page or a part of a page to be printed, and performing printing based on a result of the image processing, wherein the database includes records having the fields, and wherein the image processing and printing is repeated according to a number of records stored in the database.

According to an exemplary embodiment of the present invention, in an image processing apparatus capable of variable printing in which a part of information or image data is variable information, it is possible to easily specify correction of a light source, taking into consideration the each environment light at the print product display location in each printing work.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a list of light source types.

FIG. 11 is a list of luminance.

FIG. 12 is a list of color temperature.

DETAILED DESCRIPTION OF THE EMBODIMENTS

An editing and a printing process in variable data printing, operating as a part of application software on a personal computer according to exemplary embodiments of the present invention are described below with reference to the accompanying drawings.

First Exemplary Embodiment

Figure 1:
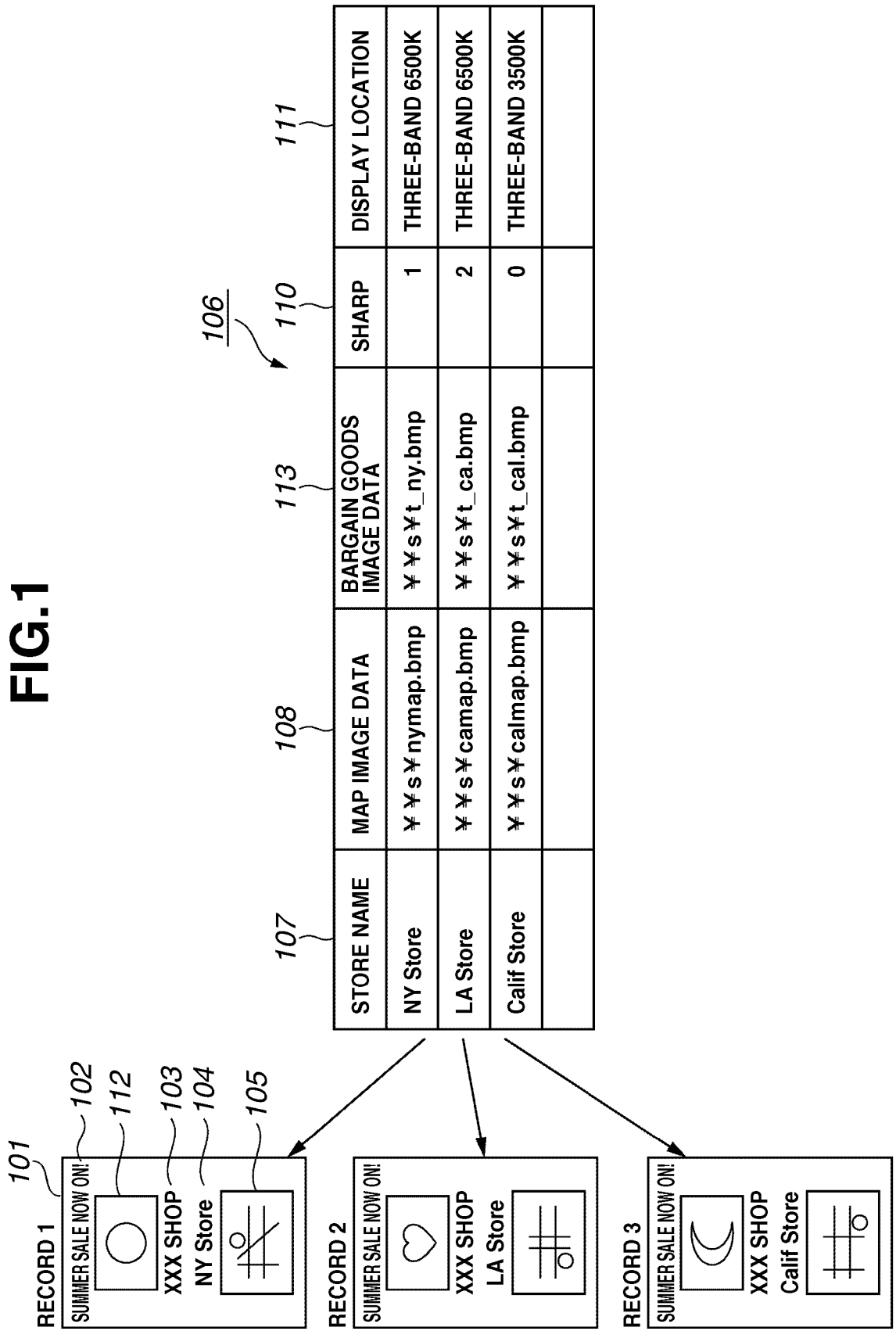
FIG. 1 is a diagram for illustrating the concept of variable printing according to an exemplary embodiment of the present invention.
Figure 2:
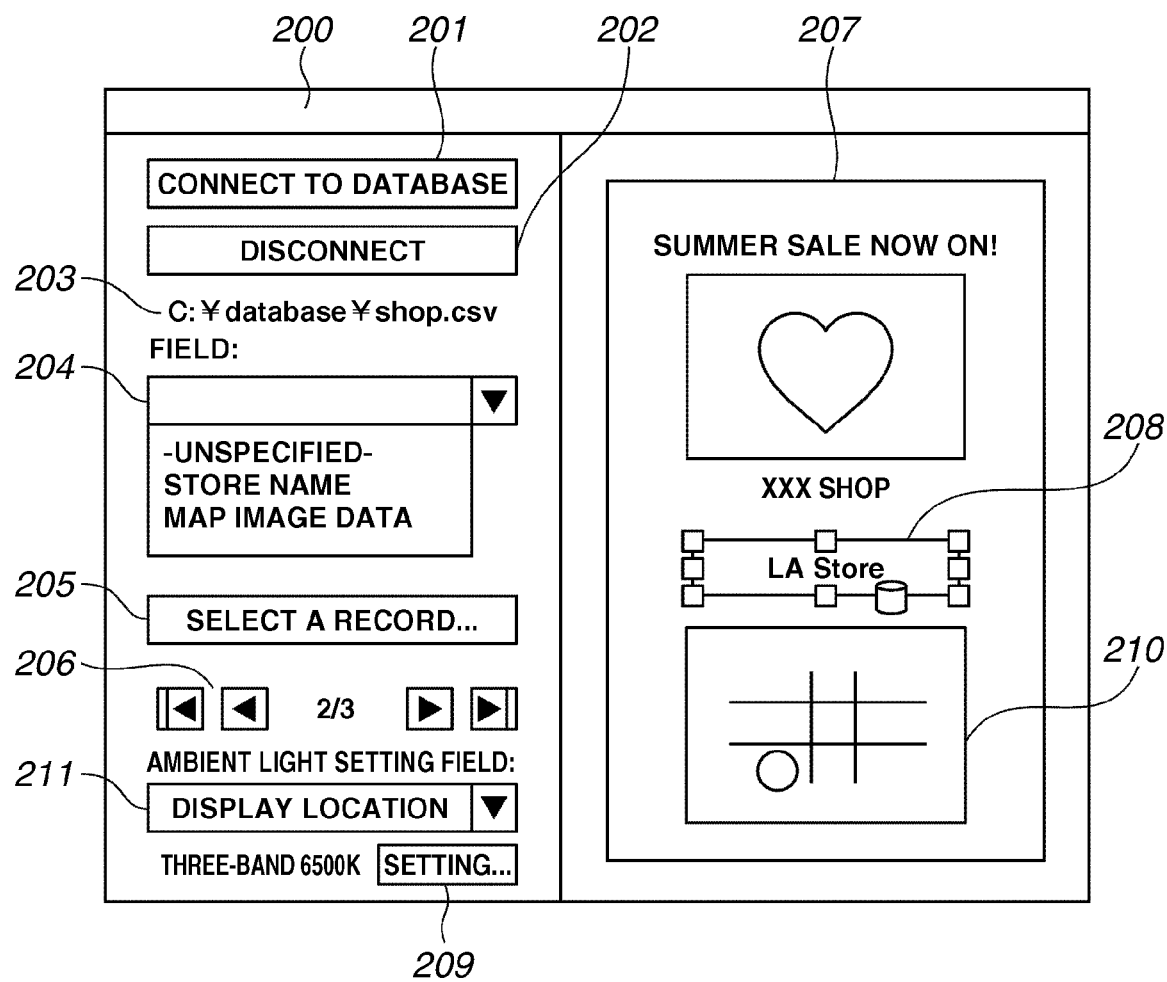
FIG. 2 is a screen image of a graphical user interface of application software having a variable print function.

FIG. 1 is a conceptual diagram illustrating variable printing according to the exemplary embodiment of the present invention. FIG. 2 is an example of a screen display during editing. A text object 208 and an image object 210 included in a master template 207 are variable information. The text object 208 is replaced by data recorded in a set database and displayed. As for the image object 210, an image file name is stored in a record of the database and a corresponding image file can be read from the database and displayed on the master template 207. In addition, data having an image file name and a path that indicates a location where an image file is stored, can be stored in a record.

Records 1, 2 and 3 in FIG. 1 refer to data in a shop name field 107, a map image data field 108, and a bargain goods image data field 113 in each record of the database 106. In variable printing, the basic layout design for the objects defined in a master template 207 is commonly maintained in all records.

For example, FIG. 1 illustrates page content 101 of record 1. Since text objects 102 and 103 are not associated as variable objects with records in the database 106, the same character strings are also displayed in the same size and location in the other records.

A text object 104 is associated as a variable object with a shop name field 107 in the database 106. Therefore, the text object 104 is replaced by a character string "NY store" and is shown in the first record of the database 106. An image object 105 is associated as a variable with a map image data field 108 in the database 106. Therefore, the image object 105 is replaced by image data designated by ¥¥s¥nymap.bmp in the first record of the database 106, and displayed. The "¥¥s¥nymap.bmp" indicates a path where the data is stored, and the notation generally used in computer systems is adopted. The path can designate a local storage area of the host device or a storage area on a network.

An image object 112 is associated as a variable object with a bargain goods image data field 113 in the database 106. Therefore, the image object is replaced by image data designated by "¥¥s¥t_ny.bmp" in the first record of the database 106, and displayed. Similarly in records 2 and 3, the variable objects are changed by data in fields of the second and the third records of the database 106, and displayed.

In the database 106, a "Sharp" processing field 110 provides correction values for sharpness processing. When the bargain goods image field 113 is designated, the bargain goods image field 113 is associated with the field 110 as a sharpness processing correction value by a user interface, which will be described later. When a page image is output, a page image subjected to the sharpness processing according to this correction value is output. A display location field 111 stores information for specifying a light source condition under which output print product is displayed. When print product is output, the print product is corrected considering the light source condition.

In the present exemplary embodiment, a data replacement processing method is not limited to a particular method. In a process of replacing text data, an automatic layout process can be performed, such as changing the font size or changing the location or size of an object according to the length of text data to be replaced. In a process of replacing an image, the image size is adjusted so that the entire image can be accommodated within a border of an image object on a corresponding master template. However, when the image object is replaced by image data with a particularly large aspect ratio, the image has to be displayed in a small size. In this case, an automatic trimming process can be performed.

As described above, with respect to records included in the database, information about corresponding image data is written in predetermined fields, and information for making corrections in image processing according to the light source is written in the other fields. By corresponding information in these fields to the fields in the master template, it is possible to perform variable printing. In the variable printing, different image data are applied in different printing work. Moreover, variable printing can be realized based on the result of correction according to a light source condition in each printing work.

The form of the database 106 is not specified in the present invention. The form of the database can be a simple table data form, such as comma separated values (CSV), or a general-purpose database form that provides various functions can be adopted.

FIG. 2 is a graphical user interface (GUI) screen image of application software having a function of variable printing according to the embodiment of the present invention. On the screen, a user can connect to a desired database, associate an object on the master template with a field on the database, select a print target record and preview data in units of the record.

The text object 208 and the image object 210 included in the master template 207 are variable information. The variable information (e.g., the text object 208) is replaced by data on a record of the set database, and displayed. As for the image object 210, an image file name is recorded in the database. An image file corresponding to the image file name is read from the database and displayed on the master template 207. Note that a path showing a location where the image file is stored, can be added to the image file name and stored in the record.

By clicking on a button 201 that specifies a desired database, a screen image for selecting a database accessible on the computer is displayed. The selected database is opened on the selection screen, and the master template 207 is connected to the database. If an object on the master template 207 has been associated with a field in the database, by clicking on a button 202 that disconnects the connected database, the association is disconnected, then the button 202 becomes selectable.

A character string 203 shows the path name of the connected database. If a database that is to be used has not been set and the master template has not been connected to the database, a character string representing a "not-connected" state is displayed. A drop-down list 204 shows a list of the field names in the connected database. The items in the drop-down list 204 are selectable when a single object in the master template 207 is selectable. When an arrow on its right side is clicked on, a list of field names is displayed. When an object is selected, if the object has been associated with a field, the name of the field is displayed. If the object has not been associated with a field, "not yet specified" displays at the top of the list.

In addition, under this condition, by selecting an optional field, the selected object can be newly associated with this field. By selecting "not yet specified" at the top, the existing association with other fields is disconnected. If there is at least one object associated with a field, a button 205 and a group of buttons 206 are selectable. The button 205 is selectable to display a record selection screen (FIG. 3) which displays all records in the database to select a record to be printed from among the records. The group of buttons 206 is operable to preview record by record the master template 207 on which the variable objects have been replaced.

By clicking on the far-left and far-right buttons, the head and the last record can be respectively displayed. By clicking on the two buttons between the far-left and far-right buttons, previous and subsequent records can be respectively displayed. The current record and the total number of records are shown by the numerator and the denominator at the center. Therefore, this example shows that the second record is displayed for preview.

In the master template 207, the text object 208 shows that the text object associated with a field in the connected database has been selected. As described above, if an object on the master template 207 is selected, the drop-down list 204 can be selected, currently associated field names are displayed, and an optional field can be associated with the master template 207. A drop-down list 211 shows a list of field names that the connected database includes, so that a light source can be specified. This drop-down list 211 can be selected at all times. When the drop-down list 211 is clicked on, a light source name, which is currently selected, is displayed below the drop-down list 211.

Figure 3:
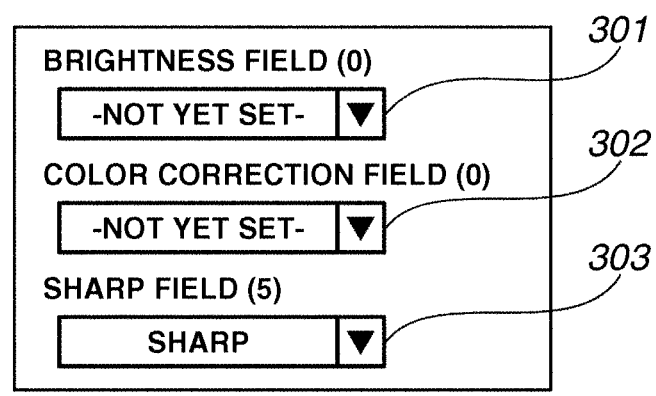
FIG. 3 is a combo box for setting image correction parameters that is displayed when an image object is selected.

FIG. 3 illustrates a group of drop-down lists for specifying correction-value fields which are displayed when an image object 210 is selected in the master template 207. The group of the lists is displayed between the drop-down list 204 and the button 205 shown in FIG. 2 when the image object 210 is selected. FIG. 3 illustrates a brightness correction value field 301, a color correction value field 302, and a sharpness correction value field 303, in which values can be input or specified. If a value has not been set in any of those fields, a predetermined default value is set. When a correction value is set in a field, the correction value for a corresponding record is displayed, and an image corrected by the correction value is displayed.

In the present embodiment, if the correction value is not set, the correction value is regarded as "0" and the corresponding correction is not performed. Correction values for the current record are written at the right of the label.

Figure 4:
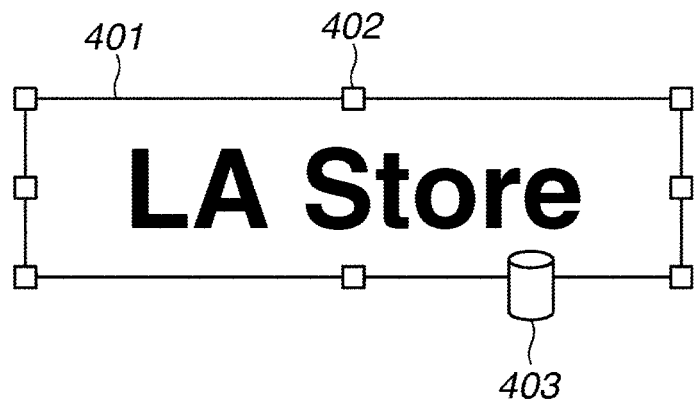
FIG. 4 is a text object in a selected state on a master template preview display illustrating association between a text object and a field.

FIG. 4 illustrates a text object associated with a selected field on the database when a master template is displayed as a preview. A selection border 401 of the text object is placed in the same state as the text object 208 described above. A resize handler 402 is used to adjust the object. By dragging the resize handler 402 with the mouse that operates the computer, the size of the object can be changed. By dragging the resize handler at a corner in the diagonal direction of the object, the object can be resized while retaining its aspect ratio. By moving the resize handler in its vertical or horizontal side, the object can be resized being contorted in the horizontal or vertical direction. An icon 403 indicates that the object is a variable object and that the object is associated with fields of the connected database. Therefore, the user can visually see whether the object is variable, on a preview display of the master template.

Figure 5:
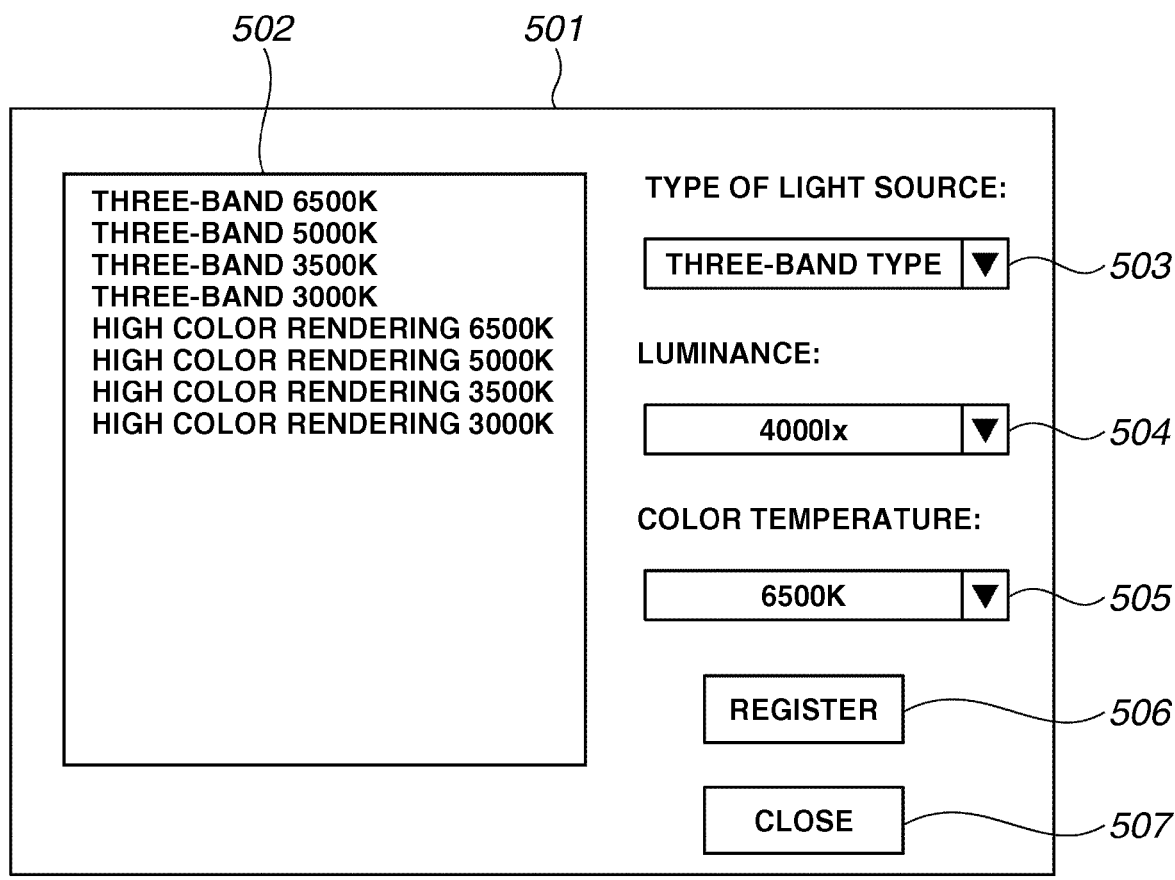
FIG. 5 is a diagram for illustrating a screen for setting the environment light.
Figure 11:
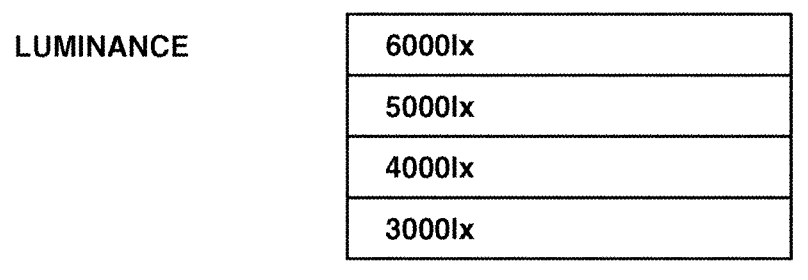

FIG. 5 is a diagram for illustrating a dialog screen 501 for setting concerning a light source. A list box 502 enables the user to select settings while seeing the list. The list box 502 shows the type names and numeric values previously set and stored in the application, as well as additionally registered by a user. FIG. 10 illustrates a list of stored names. In variable data, those names are described as data which are used when specifying light-source settings. The settings include light-source types, luminance and color temperature. A combo box 503 shows types of light source. Combo boxes 504 and 505 in FIG. 5 display details of light source settings selected via the list box 502. FIG. 11 illustrates data to be displayed in the combo box 504. In the case of FIG. 11, it is possible to set luminance in 1000 lx units from 3000 lx to 6000 lx.

The combo box 505 is configured to set color temperature. FIG. 12 illustrates data to be displayed in the combo box 505. The user uses a register button 506 to change the values of the combo boxes and store them as customized light source settings. A Close button 507 closes the dialog screen 501.

Figure 6:
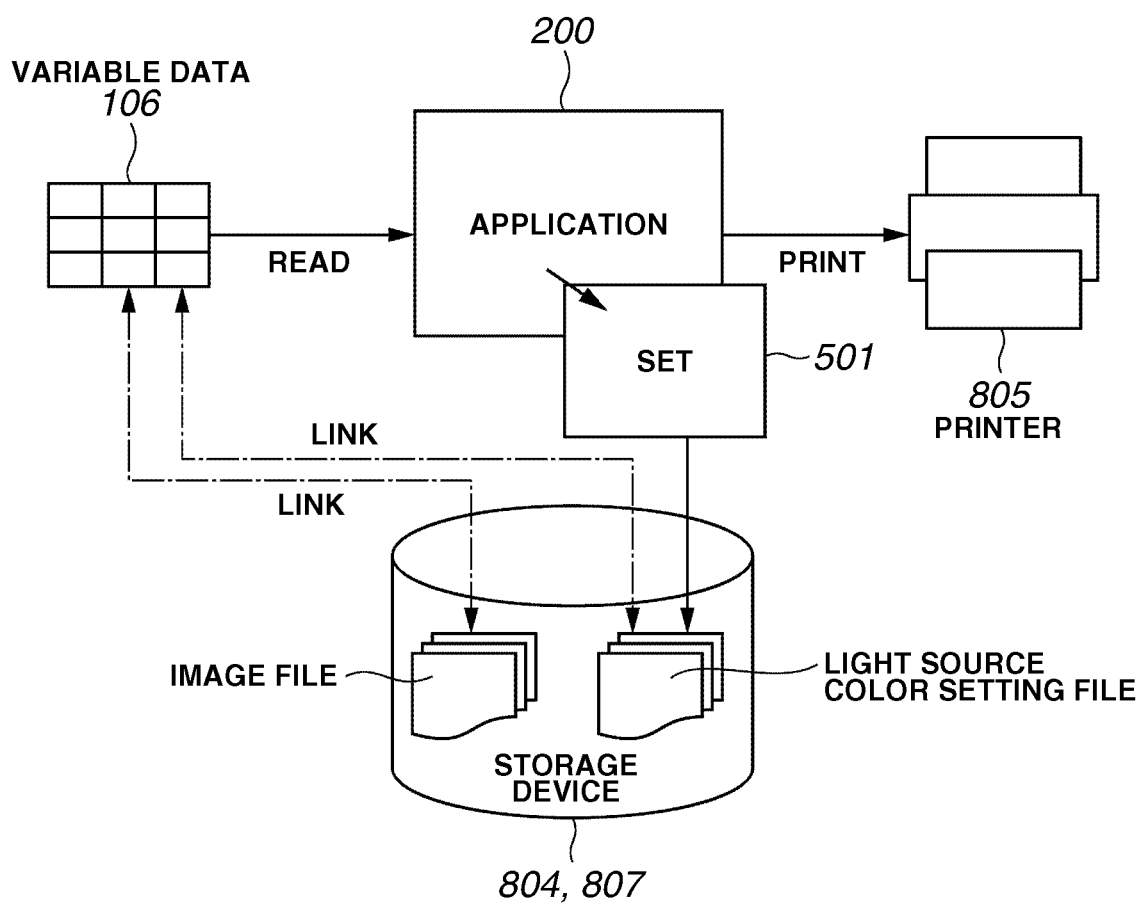
FIG. 6 is a diagram for illustrating an arrangement of the application and data.

FIG. 6 is a block diagram illustrating a configuration and an arrangement of files according to the exemplary embodiment of the present invention.

An application 200 in FIG. 2 reads variable data stored in the database 106. In the variable data, paths indicating locations where image data files are stored, and file names of image data, image correction parameters, and light-source settings information are described. The application 200 reads variable data and performs field setting. Moreover, the application 200 obtains an image file and a light-source condition file stored in the storage device 804 or 807 using information which has been set. On the basis of those items of information, the application 200 performs various kinds of image correction and environment light correction, and outputs an obtained image to the printer 805.

Figure 7:
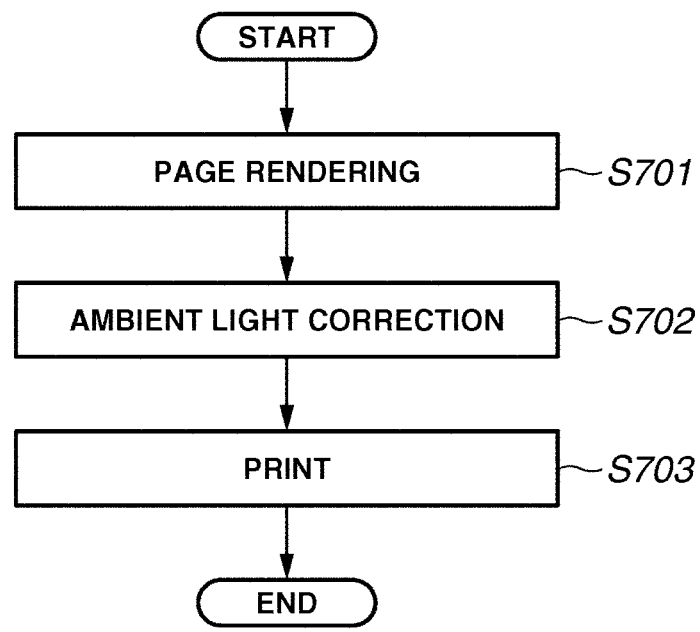
FIG. 7 is a flowchart for illustrating a process during printing.

FIG. 7 is a flow for a printing process. In the present embodiment, environment light correction is performed on the entire page. Page rendering is carried out in step S701. In step S702, environment light correction is performed, and then in step S703, printing is carried out. The correction in step S702 is classified into image processing. In step S702, light-source setting in variable data which is performed on a print target record is read, and image data is sent to a correction processing unit and processed. With regard to details of correction corresponding to the environment light, a configuration such as described in Japanese Patent Application Laid-Open No. 11-041478 can be adopted.

Figure 8:
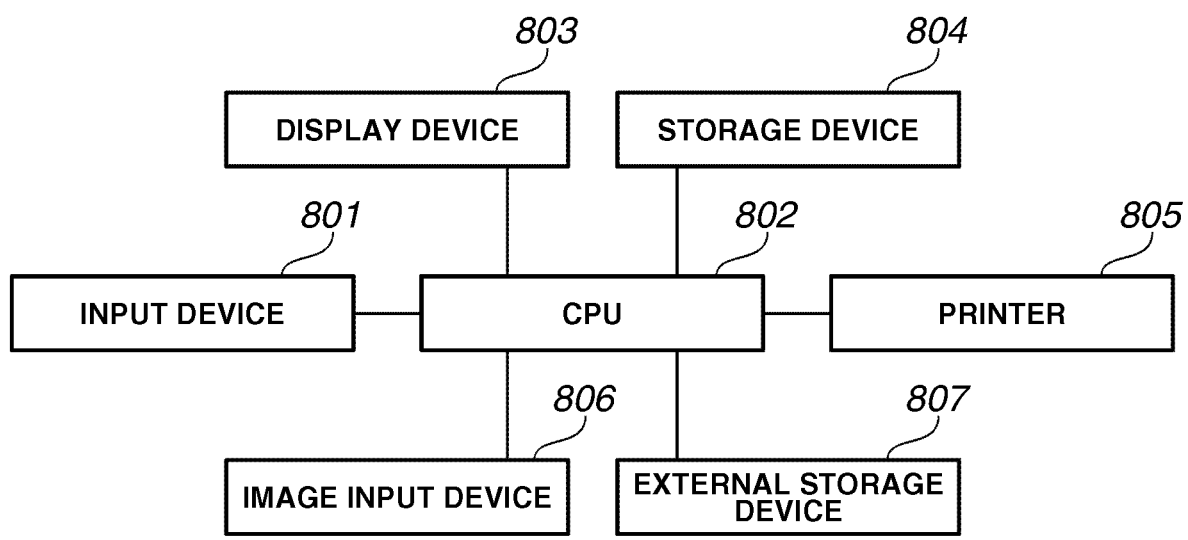
FIG. 8 is a block diagram for illustrating a configuration of an image processing apparatus according to an embodiment of the present invention.

FIG. 8 is a block diagram illustrating a configuration of an image processing apparatus according to the embodiment of the present invention. The image processing apparatus includes an input device 801, such as a keyboard or a mouse, a central processing unit 802, a display device 803 and a storage device 804 such as a hard disk, for storing image data files and corresponding image correction command history files. The central processing unit 802 manages and controls the system, inputs and corrects images and generates edit data for printing. The image processing apparatus further includes a printer 805 for outputting edit data, an image input device 806 such as a film scanner, a flat head scanner, and a digital camera, and an external storage device 807 such as a drive for reading storage media, and a reader for an external memory used in digital cameras.

Figure 9:
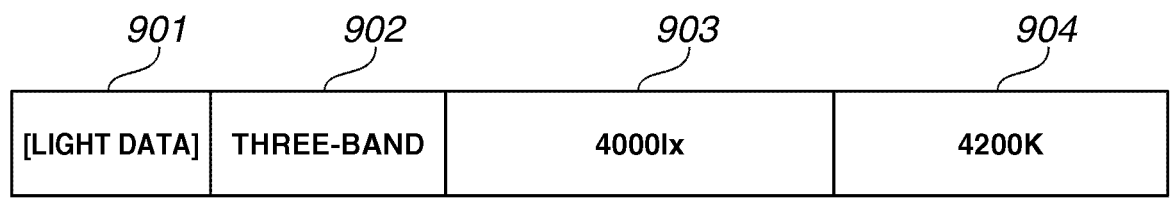
FIG. 9 is a diagram for illustrating an exemplary environment light setting file.

FIG. 9 illustrates data for setting light source conditions. A header 901 indicates that this file is an environment light setting file. In this embodiment, the header is identified as "LIGHT DATA". Data 902, which shows a type and a form of a light source, has words written as illustrated in FIG. 10. Data 903 and 904 indicate luminance and color temperature respectively in which information as illustrated in FIGS. 11 and 12 is written. These file names are the list names in the setting screen in FIG. 5. When customizing the environment light settings, the user can name the files as desired.

Referring to FIGS. 1 to 12, processing from registration of environment light settings to variable data printing using those settings is described in the following.

Before performing variable printing, ambient illumination light is measured in the display locations at each shop. The ambient illumination light is measured using dedicated devices, and a type or a form of light source, measure luminance and color temperature are detected. As simple ways of environment light measurement, color temperature can be determined by checking a type or a model of lighting equipment used at the display location. Further, as a simple way of measurement, a recommended fixed value can be used for luminance.

Then, a master template and variable data used in the template are generated. When variable data is generated, environment light settings obtained from the type names of ambient illumination light used at each shop are embedded in variable data.

When settings of the environment light are customized, a user activates the setting screen by selecting the "Set" button 209 shown in FIG. 2 from the application. On the activated setting screen in FIG. 5, the user selects the type of light source, luminance or color temperature and clicks on the "Register" button 506 in FIG. 5 to set new data of the environment light. To switch the displayed item name, the user can select the default item and change the name. It is convenient if the user changes the item name to a shop name to enable him to easily recognize for which shop the settings are made even if the environment light settings remain default and unchanged.

Then, the database 106 is associated with the master template. In a state that the application 200 is started, the "Connect to database" button 201 is selected, and a previously created variable data file is opened. Then, the objects in the master template 207 are associated with the fields in the variable data file 106. In the associating process, if the image object 210 is selected, a combo box is displayed for setting correction values as illustrated in FIG. 3. In the present embodiment, since there is the sharpness setting field 110 in the database 106, sharpness processing is set by setting the field 110. When setting of the fields is finished, the correction process is reflected on the specified image object in the page. At this time, the environment light setting field is also set in the combo box 211. When all settings are finished, printing is performed. In a printing process, after page rendering in step S701 of FIG. 7 is finished, correction in step S702 is performed on the entire page, and printing is carried out in step S703.

After one record is printed, a subsequent record is printed. Printed products on which environment light correction is performed, can be made in the variable printing manner for each shop. In the present embodiment, image correction includes sharpness processing, color correction and brightness correction, however, the correction function can also include other processing, such as automatic color correction, monochrome processing, soft focus, contrast adjustment and gamma adjustment.

In the present embodiment, the environment light setting file includes types of light source, luminance, and color temperature. However, luminance can be a fixed value, or the file can include a fluorescent lamp code or any other specified item. Further, the environment light setting can be stored on a memory instead of the file. Moreover, an environment light setting file or an image file can be stored on a network.

Other Exemplary Embodiment

The present invention can be applied to a system including a plurality of devices (e.g., a host computer, an interface device, a reader, a writer, and a printer) or can be applied to an apparatus including only a single device (for example, a copying machine or a facsimile).

Furthermore, the exemplary embodiment described above can be realized by supplying program code to a computer in an apparatus or a system connected to various devices to run these devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-330694 filed Dec. 7, 2006, which is hereby incorporated by reference herein in its entirety.

What is claimed is:

1. An image processing apparatus comprising:
 a storing unit configured to store combinations of a plurality of objects to be placed on a common template and a plurality of items of information regarding environment light conditions for each of a plurality of display locations where printed records of the common template on which each of the objects is placed is to be displayed,
  wherein each display location among the plurality of display locations is associated with a different object among the combinations of the plurality of objects to be placed on the common template;
an acquiring unit configured to acquire the objects and the items of information regarding the environment light condition for each of the plurality of display locations in accordance with each of the combinations stored by the storing unit;
a processing unit configured, with respect to each of the combinations, to place at least one of the objects associated with a first particular location among the plurality of display locations acquired by the acquiring unit on the common template and perform image processing on image data based on the common template on which the acquired object is placed in accordance with one of the items of the information regarding the environment light condition for the first particular location among the plurality of display locations acquired by the acquiring unit to form a first image,
wherein the processing unit is further configured, with respect to each of the combinations, to place at least one of the objects associated with a second particular location among the plurality of display locations acquired by the acquiring unit on the common template and perform image processing on image data based on the common template on which the acquired object is placed in accordance with one of the items of the information regarding the environment light condition for the second particular location among the plurality of display locations acquired by the acquiring unit to form a second image; and
a print control unit configured to cause a printer to print the first and second images as printed records corresponding to each of the combinations based on the image data and based on the common template on which the acquired object is placed and on which the image processing is performed by the processing unit, on printing mediums, wherein the first and second images are printed with different data associated with different locations, wherein a different environment light condition for the first and the second images are being set.

2. The image processing apparatus according to claim 1, wherein the processing unit performs the image processing which is at least one of color correction, contrast adjustment, monochrome, sharpness, soft focus, and gamma adjustment.

3. A method comprising:
storing combinations of a plurality of objects to be placed on a common template and a plurality of items of information regarding environment light conditions for each of a plurality of display locations where printed records of the common template on which each of the objects are placed is to be displayed,
  wherein each display location among the plurality of display locations is associated with a different object among the combinations of the plurality of objects to be placed on the common template;
acquiring the objects and the items of information regarding the environment light condition for each of the plurality of display locations in accordance with each of the stored combinations;
placing, with respect to each of the combinations, at least one of the acquired objects associated with a first particular location among the plurality of display locations on the common template to form first image data;
performing, with respect to each of the combinations, image processing on the first image data based on the common template on which the acquired object is placed according to one of the acquired items of the information regarding the environment light condition for the first particular location among the plurality of display locations to form the first image;
placing, with respect to each of the combinations, at least one of the acquired objects associated with a second particular location among the plurality of display locations on the common template to form second image data;
performing, with respect to each of the combinations, image processing on the second image data based on the common template on which the acquired object is placed according to one of the acquired items of the information regarding the environment light condition for the second particular location among the plurality of display locations to form the second image; and
causing a printer to print the first and second images as printed records corresponding to each of the combinations based on the image data and based on the common template on which the acquired object is placed and on which the image processing is performed, on printing mediums, wherein the first and second images are printed with different data associated with different locations, wherein a different environment light condition for the first and the second images are being set.

4. The image processing apparatus according to claim 1, wherein the acquiring unit acquires at least one of a type of a light source, luminance and color temperature as the information regarding the environment light conditions.

5. The method according to claim 3, wherein the image processing is at least one of color correction, contrast adjustment, monochrome, sharpness, soft focus, and gamma adjustment.

6. The method according to claim 3, wherein the information related to the environment light condition is at least one of a type of a light source, luminance and color temperature as the information regarding the environment light conditions.

7. The image processing apparatus according to claim 1,
  wherein at least one common object among the combinations of the plurality of objects to be placed on the common template is associated with all of the plurality of display locations;
  the processing unit is further configured to place the common object on the common template when forming the first image and the second image.

* * * * *